March 6, 1956  A. M. WRIGHT  2,737,015
JET ENGINE CONTROL
Filed May 7, 1948  4 Sheets-Sheet 1

INVENTOR
A. M. WRIGHT
BY
ATTORNEY

March 6, 1956  A. M. WRIGHT  2,737,015
JET ENGINE CONTROL

Filed May 7, 1948 4 Sheets-Sheet 4

Fig. 5

INVENTOR
A. M. WRIGHT
BY
ATTORNEY

United States Patent Office 2,737,015
Patented Mar. 6, 1956

2,737,015

JET ENGINE CONTROL

Alexander M. Wright, West Hartford, Conn., assignor, by mesne assignments, to Pratt & Whitney Company, Incorporated, West Hartford, Conn., a corporation of Delaware Application May 7, 1948, Serial No. 25,739

13 Claims. (Cl. 60—35.6)

This invention pertains to automatic controls for jet engines and more particularly has reference to controls for regulating and equalizing the thrusts from the several jet engines of multi-engine aircraft. While this invention is primarily applicable to plain (ram) jet engines, it also applies to turbo-jet engines, either with or without a propeller, in which a substantial part of the propelling power of the engine is exerted through the jet effect of its exhaust gases. Unless otherwise qualified, it will be understood that the term "jet engines," as used in this application, includes all of these types of engine.

In the operation of high speed aircraft, propelled by jet engines, it is essential not only that the thrust of each engine be at all times under the control of the pilot, but also in multi-engine aircraft the thrusts from the several engines be equalized and balanced, in order that no yaw moment be developed tending to make the airplane go off course.

In multiple, jet engined aircraft, moving at speeds approaching or perhaps exceeding sonic velocity, small differences in thrust between different engines may cause a material yaw moment to prevail, and in case of a substantial loss of thrust by any engine, the yaw moment, if not rapidly corrected, may result in serious difficulties.

Heretofore, the performance of an aircraft turbo-jet engine with a propeller (prop-jet) has generally been controlled by regulating the speed (R. P. M.) of the engine and/or the pitch of the propeller, so as to maintain a constant speed and/or thrust of the propeller for any given setting of the pilot's control lever, and in the turbo-jet engined aircraft, having no propeller, the performance of the engine has been controlled by regulating the speed of the gas turbine which drives its air compressor, so as to maintain a constant speed of the engine with any given setting of the pilot's control lever. In multi-engine aircraft, with both turbo-jet and prop-jet engines, the aerodynamic balance of the airplane has been controlled by synchronizing the speed (R. P. M.) of the several engines, usually based on the speed of one of the engines selected as a master engine.

With prop-jet engines at the higher speeds, when a considerable part of the thrust developed by the engines is due to the jet effect, and with turbo-jet engines at all speeds, experience has shown that the aerodynamic balance of a multiple engine airplane cannot be satisfactorily controlled by synchronizing only the speeds of the several engines, because for the same engine speed the thrust of any engine may vary as much as 10% to 15%, depending upon the operating characteristics and condition of the particular engine. Accordingly, in order that a multi-engine airplane may fly a straight course, it is necessary to balance the thrusts of the several engines and to maintain this balance at all times, preferably without manual manipulation by the pilot.

Experience has also shown that turbo-jet and plain jet engines may encounter difficulties from excessive engine speeds and temperatures, and it has been customary heretofore to provide each engine with a device responsive to engine speed (R. P. M.) and (tail pipe) temperature which will override the automatic control and limit the speed of the engine to a maximum safe R. P. M. whenever greater speeds and temperatures are developed in the engine. In regulating and equalizing the thrusts of the several jet engines of multi-engine aircraft, it is also desirable to provide means for preventing the overspeeding or overheating of any engine without disturbing the balance of the group.

In a multi-engine aircraft, it is also desirable that the pilot be able to normally control all the engines from a single manual control lever, but each engine should be capable of operation independently of all the others, so that in case trouble develops in any one engine, causing it to operate below par, the efficiency of the other engines will not be affected.

In a companion application of Milton E. Chandler, Serial No. 23,936, filed April 29, 1948, and assigned to the same assignee as this application, there was disclosed an hydraulically operated control system for jet engines of a multi-engine aircraft, wherein the jet thrusts of one or more engines were automatically regulated and equalized, so that the thrusts of all the engines were balanced with each other, and any yaw moment tending to make the aircraft go off course was eliminated. In that control system, the operation of a plurality of jet engines was controlled by selecting one engine to function as a master, and this engine regulated the performance of the other engines of the group as slave engines.

Such a control system is open to two objections, which the invention herein disclosed is designed to overcome. First, the use of high pressure oil piping required in an hydraulic control system involves an inherent danger of leakage and loss of control, and the weight of hydraulic equipment also adds considerably to the dead load on the airplane. Secondly, the use of one engine of a multi-engine aircraft to control the operation of the other engines necessarily limits the overall performance of the whole group to that of the master engine, and whenever the performance of that engine is below par or average performance of the group, there is an unavoidable loss of power and efficiency of all the other engines.

The invention herein disclosed is, therefore, in the nature of an improvement over that disclosed in the companion application cited above.

Accordingly, an object of this invention is to provide means for controlling the operation of a group of jet engines by regulating the performance of all the engines from a single manual control lever, which is set to secure a desired thrust from each engine at any airplane speed, and automatically regulating and equalizing the thrust of each engine with that of the others, including means for automatically varying the selected thrust of each engine as a function of the discharge pressure of the engine air compressor.

Another object is to provide electrically operated means for automatically regulating and equalizing the thrusts from a plurality of jet engines in a multi-engine airplane so that no yaw moment will be produced tending to make the airplane go off course.

Another object is to provide means for automatically controlling the operation of a plurality of jet engines of a multi-engine airplane in response to a single manual control element, so that the thrusts from all the engines are equalized and balanced.

Another object of this invention is to provide a control system for a group of jet engines in a multi-engine aircraft, wherein each engine is provided with an identical control, and all these controls are so interrelated that the performance of all the engines can be controlled from the single manual control lever, but each engine operates independently of all the others, so that below par performance of any engines does not affect the efficiency of the other engines.

Another object of this invention is to provide means for electrically controlling the operation of a jet engine from the thrust produced by its exhaust gases, so as to obtain a desired thrust in response to any given setting of the pilot's control lever, within the limits of safe temperature and speed of the engine.

Still another object is to provide a speed and temperature override control device for each engine of a multi-engine airplane, so that if the speed or temperature of any engine should exceed a predetermined safe limit, the override device temporarily takes control of that engine and reduces its speed to safe operating limits as determined by the setting of the override control device.

With these and other objects in view which may be incident to my improvements, my invention consists in the combination and arrangement of elements hereinafter described and illustrated in the accompanying drawings in which.

Figure 1:
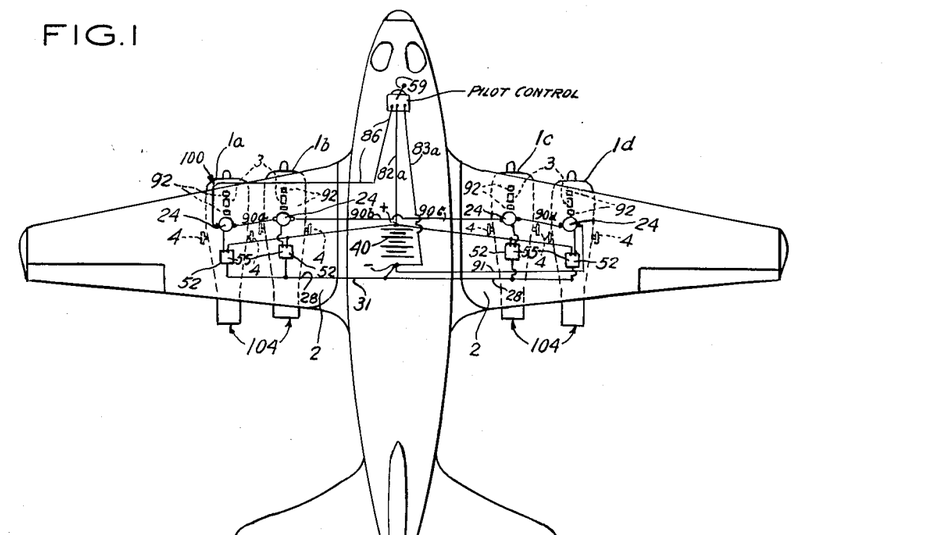
Figure 1 is a diagrammatic plan view of an airplane propelled by a plurality of jet engines, showing the position of the engines relative to the aircraft.
Figures 2, 3:
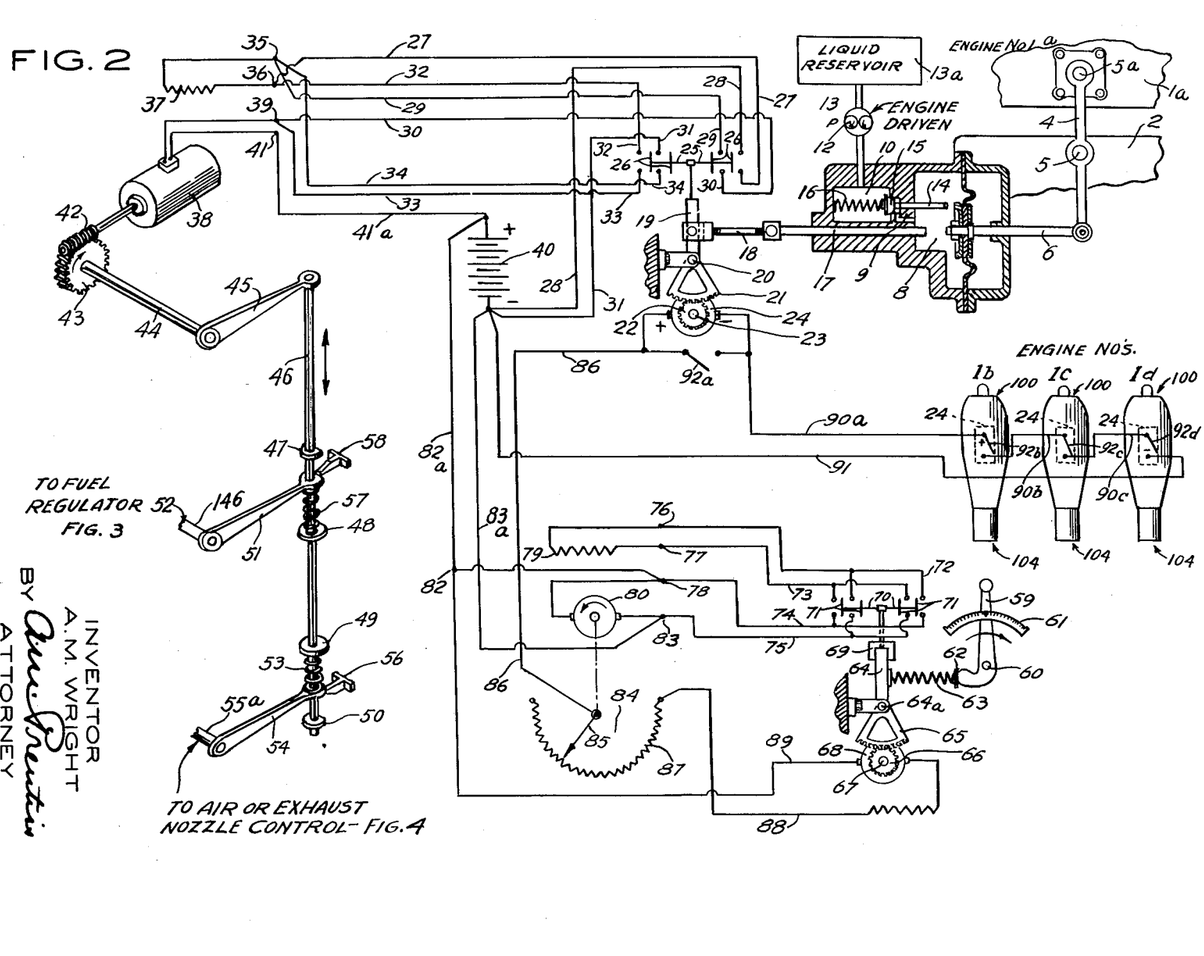
Figure 2 shows, schematically, the arrangement of the electric circuits and associated control devices of my improved control system.
Figure 3 is a schematic view showing the arrangement of a fuel regulator as a part of my improved control system.
Figure 3:
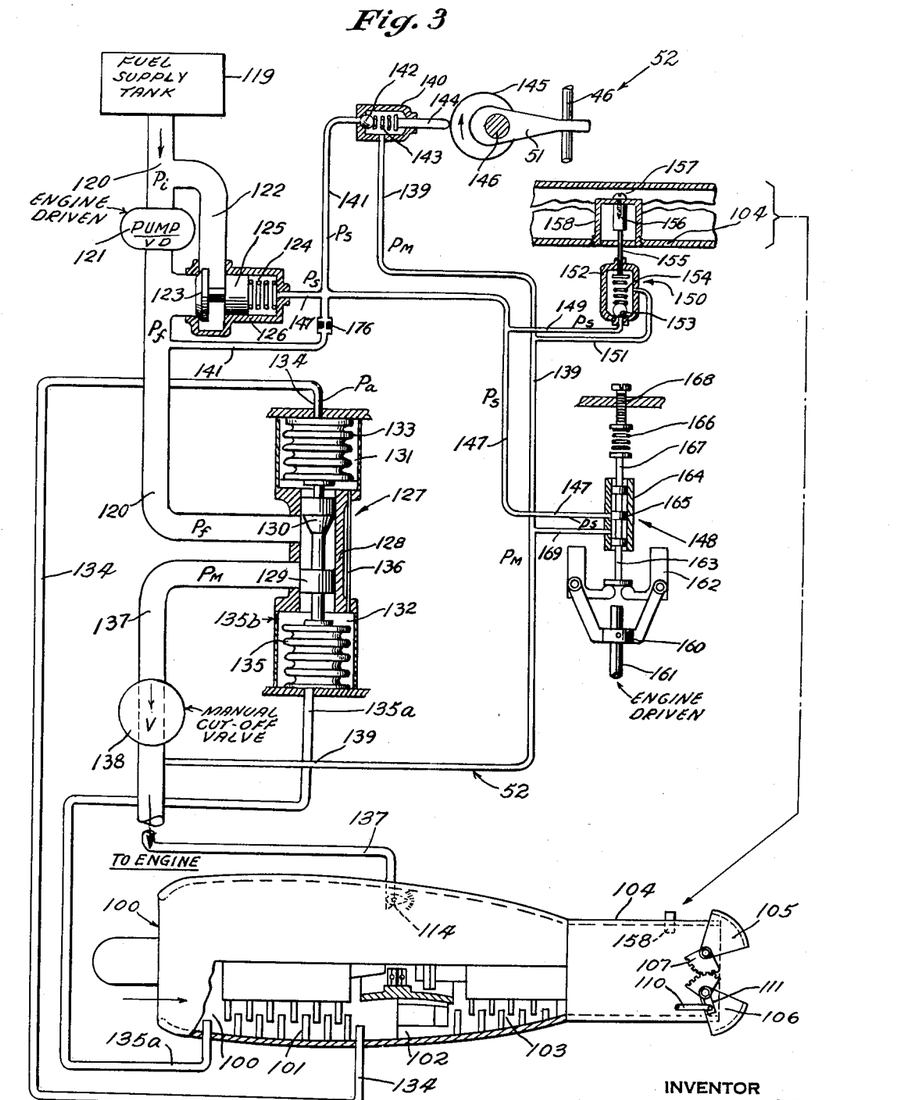

Referring to Figure 1 of the drawings, the reference numerals 1a, 1b, 1c and 1d denote a plurality of jet engines each having the usual air intake duct 100 at the front, followed (as shown in Figure 3) in the order named by an air compressor 101, a combustion chamber 102, a gas turbine 103 and a tail pipe 104 through which the exhaust gases are discharged to the rear, in the form of a fluid jet that constitutes part of the propelling thrust of the prop-jet, and the whole of the propelling thrust, in the turbo-jet and plain jet engines.

It will be understood that the embodiment of my invention herein disclosed is shown as applied to a multiple jet engined aircraft, all the engines being identical and each equipped with identically the same mounting and control apparatus. For brevity and clarity, Figure 2 shows only one engine (1a); the other engines being hooked onto the common electrical control line as indicated at the right of Figure 2.

Figure 4:
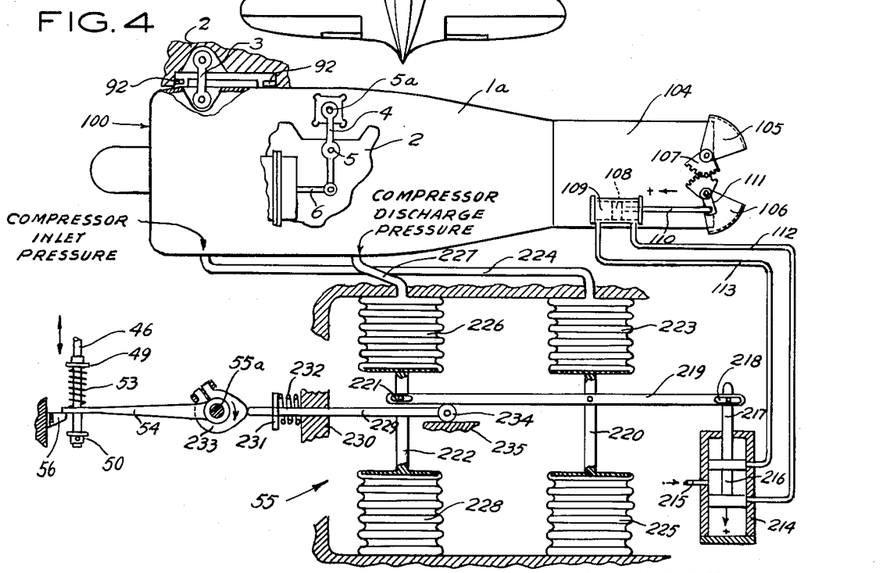
Figure 4 is a schematic view showing the mounting of the jet engine on the chassis of the aircraft and controls for operating the exhaust gas nozzle area varying means.
Figure 5:
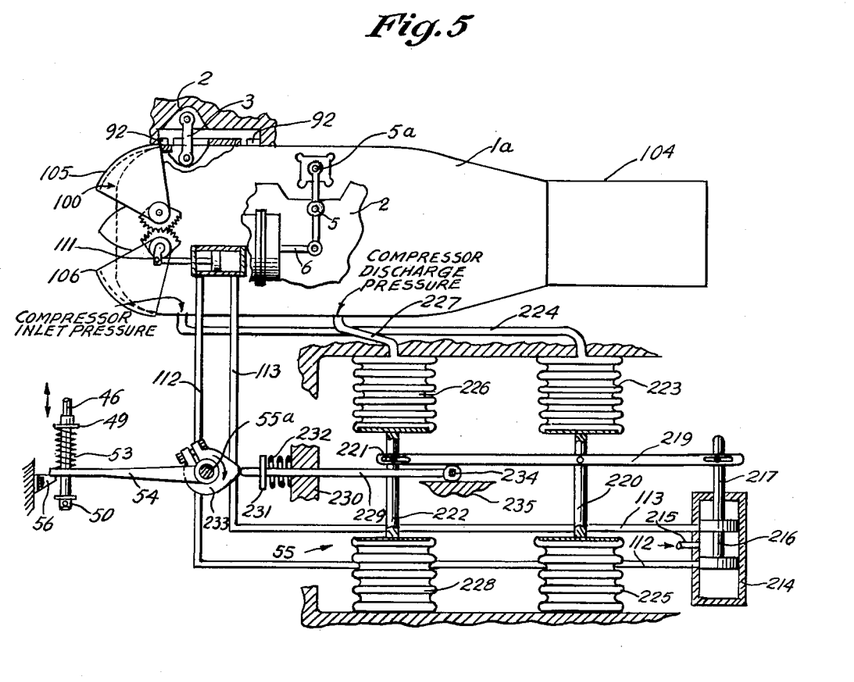
Figure 5 is a view, similar to Figure 4, but showing the controls for operating the engine air intake area varying means.

Referring to Figures 1, 2 and 4, engine 1a is mounted in the chassis 2 of the airplane by means of a plurality of rocker arms 3 and 4 which are pivoted to the frame of the engine 1a and to the chassis 2 of the airplane, as shown in Figures 1, 2 and 4, so that the engine 1a is free to move, to a limited extent, in a straight line parallel to the longitudinal axis of the engine and the airplane. There is preferably one forward rocker arm 3, located on the top longitudinal center line of the engine near its front end, and two rear rocker arms 4, located one on each side of the engine aft of its center of gravity, so as to constitute a three-point suspension.

Each rocker arm 4 is mounted on a pivot 5 on the aircraft chassis 2 and is pivotally connected at one end to a lug 5a on the engine frame and the other end by a rod 6 to a diaphragm 7 mounted in an hydraulic recoil chamber 8 which is fixedly attached to the chassis 2 of the airplane. When the engine 1a is in operation, the force of the exhaust gas jet which is discharged to the rear (to the left in Figure 2) exerts a reactive thrust on the engine tending to move it in the opposite direction (to the right in Figure 2). This thrust and movement of the engine is resisted by a liquid (oil) under high pressure in chamber 8 to the left of diaphragm 7, which exerts a thrust in an opposing direction on diaphragm 7, rod 6, arm 5 and lug 5a.

Chamber 8 is connected through a passage 9 in its left side wall, with a smaller chamber 10 which communicates through a conduit 11 with a liquid pump 12 driven by the engine 1a. A conduit 13 connects pump 12 with a liquid reservoir 13a which serves as a source of liquid for said pump. Slidably mounted in the left side wall of chamber 8 is a stem 14 of a valve 15, which is biased towards its seat by a spring 16 in chamber 10. The end of stem 14, opposite valve 15, projects into chamber 8, so as to be engaged by diaphragm 7 and pushed to the left whenever the escape of liquid from chamber 8 to the left of diaphragm 7 (through leakage), permits said diaphragm to move a sufficient distance to contact stem 14. This movement of stem 14 unseats valve 15 and permits liquid in chamber 10, under pressure from pump 12, to enter the left side of chamber 8 until the pressure therein is sufficient to push diaphragm 7 to the right and again seat valve 15, whereupon diaphragm 7 is restored to its normal operating position in chamber 8, as shown in Figure 2. The operation of valve 15 thus maintains the liquid pressure in chamber 8 to the left of diaphragm 7 at normal operating pressure at all times, notwithstanding any escape of liquid through leakage from chamber 8.

Also slidably mounted in the left side wall of chamber 8, is a plunger 17, which is connected through a link 18 with a lever 19, mounted on a fixed pivot 20. The cross-sectional area of plunger 17 is a small percentage (e. g. 1%) of the area of diaphragm 7, so that the force from liquid pressure in chamber 8, acting on plunger 17 and tending to push it to the left, is only the same small percentage of the total force transmitted to diaphragm 7 through rod 6 and arm 4 from the thrust of engine 1a, due to the reaction of its jet.

The lower part of lever 19 below pivot 20 is in the form of a gear sector 21, which meshes with a toothed pinion 22 fixed to the armature shaft 23 of a torque motor 24. The other end of lever 19 carries a cross arm 25 to which are fixed four contacts 26 adapted upon movement of cross arm 25 to the right or left to alternately contact either the terminals of electric wires 27, 28, 29, 30, or 31, 34, 32 and 33, all as shown in Figure 2. Wires 29 and 34 lead to terminal 35, and wires 27 and 32 to terminal 36, in the field circuit 37 of a regulator motor 38, while wires 30 and 33 lead to terminal 39 in the armature circuit of said motor. Wires 28 and 31 lead to the negative pole of a battery 40 of which the positive pole is connected to terminal 41 of motor 38. Battery 40 furnishes electrical energy to operate motor 38 in a clockwise direction when cross-arm 25 on lever 19 moves to the left and causes contacts 26 to close circuits 31—34, and 32—33, and conversely motor 38 is operated in a counter-clockwise direction when cross arm 25 moves to the right and closes circuits 27—28 and 29—30.

Motor 38 drives a worm 42 meshing with a worm gear 43, which is connected by a shaft 44 and arm 45 to a rod 46. Adjustably fixed on rod 46, are washers 47, 48, 49 and 50. When rod 46 is moved downward by motor 38, washer 47 is adapted to engage and cause the downward travel of an operating arm 51 on a fuel supply regulator 52, while a spring 53 between washer 49 and arm 54 of an air intake duct or tail pipe regulator 55 (Fig. 4) is compressed because a fixed lug 56 engages arm 54 and holds it in the position shown in Figure 2. Conversely, when rod 46 is moved upwardly by motor 38, washer 50 engages arm 54 and pushes it up, while washer 48 and spring 57 between washer 48 and arm 51 pushes arm 51 up until it contacts a fixed lug 58, whereupon arm 51 becomes stationary in the position shown in Figure 2. As rod 46 moves up, arm 54 is carried up and spring 57 is compressed.

The positions of arms 51 and 54 shown in Figure 2 correspond to the maximum rate of fuel supply to the engine by fuel regulator 52 (shown in Figure 3) and to the minimum opening of, either the air intake 100 through which combustion air is supplied to the engine, or the tail pipe 104 through which exhaust gases are discharged therefrom, depending upon to which of these elements the regulator 55 (shown in Figure 4) is applied. A downward rotation of arm 51 from its position shown in Figure 2, causes fuel regulator 52 to decrease the rate of fuel supply to the engine, and the lowest position of arm 51 corresponds to the minimum rate of fuel supply. Similarly, an upward rotation of arm 54 from its position shown in Figure 2, increases the opening of either the air intake duct 100 or the tail pipe 104 of the engine, and its uppermost position corresponds to the maximum opening of either.

By the foregoing arrangement, the normal operation of the engine is controlled by the fuel regulator 52, in response to the jet thrust of the engine, until the maximum thrust of which the engine is capable is reached, with a fixed cross-sectional area of the engine air intake duct 100 or tail pipe 104, whereupon further control of the operation of the engine is effected by increasing the area of the air intake duct, or decreasing the area of the tail pipe, by the regulator shown in Figure 4, until the maximum or minimum cross-sectional area of either respectively is reached.

The multiple jet engine aircraft shown in Figure 1 is provided with a pilot's manual control lever 59, whereby the operation of each engine is automatically regulated, except when it is cut out of the common control circuit for the group of engines, and the single manual control lever enables the pilot to control the operation of all the engines as a group. Manual control lever 59 is mounted on a fixed pivot 60, and engages a quadrant sector 61 which is graduated to show engine thrust. The total thrust developed by all the engines controlled from the single manual control lever 59 is the product of the thrust setting of the control lever times the number of engines controlled thereby.

The lower end of lever 59 bears against a disc 62 attached to a compression spring 63, which seats against a lever 64 mounted on a fixed pivot 64a near its center. Below this pivot, lever 64 is formed in the shape of a gear sector 65 which meshes with a toothed pinion 66 fixed to the armature shaft 67 of a torque motor 68. Above spring 63 lever 64 carries a counter-weight 69 whose function will be hereinafter described, and at the upper end of lever 64 is a cross arm 70 to which are fixed four contacts 71 adapted upon movement of arm 70 to the right or left to alternately contact the terminals of either electric wires 72, 74, 73 and 75, or 72, 75, 73 and 74, all as shown in Figure 2. Wires 72 and 73 lead to terminals 76 and 77, respectively, in the field circuit 79 of a rheostat motor 80. Wire 74 leads to terminal 78 in the armature circuit of motor 80 which is connected through terminal 82 to the positive side of battery 40. Wire 75 leads to terminal 83 which is connected by wire 83a to the negative side of battery 40. This battery furnishes electrical energy to operate motor 80 in a counter-clockwise direction when cross arm 70 on lever 64 moves to the left and causes contacts 71 to close circuits 72—75 and 73—74, and conversely, motor 80 is operated in a clockwise direction when cross arm 70 moves to the right and closes circuits 73—75 and 72—74.

Motor 80 operates an arm 85 of a rheostat 84 which is connected by wire 86 to the positive terminal of torque motor 24 while the resistence 87 of rheostat 84 is connected to the negative terminal 88 of motor 68 whose positive terminal 89 is connected through terminal 82 with the positive pole of battery 40.

The negative terminal of torque motor 24 is connected by wire 90a with the positive terminal of a similar torque motor of engine number 1b, and thus in series with similar torque motors of all the engines of the group, the negative terminal of the torque motor of the last engine 1d being connected through return wire 91 to the negative pole of battery 40.

Whenever the reactive thrust of the exhaust gas jet increases to a point where it moves the engine 1a to the right, arm 4 and rod 6 move diaphragm 7 to the left, thus increasing the hydraulic pressure in chamber 8. This increased pressure moves plunger 17, and the upper part of lever 19, to the left against the resistance of torque motor 24 until cross arm 25 brings contacts 26 against the terminals of wires 31—34 and 32—33. The closing of these circuits through the field and armature of regulator motor 38 energizes said motor and causes it to rotate in clockwise direction, depressing arm 45, rod 46 and arm 51 of fuel regulator 52, and thereby reducing the rate of flow of fuel to the engine. This decrease in fuel flow decreases the power output and thrust of the engine until the force exerted by the engine on diaphram 7 is less than the liquid pressure in chamber 8, whereupon diaphragm 7 moves back to the right and until equilibrium with the engine thrust is again established and a condition of steady engine operation is resumed.

Conversely, whenever thrust of the exhaust gas jet on the engine 1a falls to a value less than the force of liquid pressure on diaphragm 7, sad diaphragm moves to the right, thus decreasing the hydraulic pressure in chamber 8. This decreased pressure permits plunger 17 and the upper part of lever 19 to be moved to the right by the then superior force of torque motor 24, until cross arm 25 brings contacts 26 against the terminals of wires 27—28 and 29—30. The closing of these circuits energizes fuel regulator motor 38 and causes it to rotate in a counter-clockwise direction, elevating arm 45, rod 46 and arm 51 of fuel regulator 52, and thereby increasing the rate of fuel flow to the engine. This increase in fuel flow increases the power output and thrust of the engine until the force exerted by the engine on diaphram 7 is greater than the liquid pressure in chamber 8, whereupon diaphram 7 moves back to the left until equilibrium with the engine thrust is again established and a condition of steady engine operation is resumed.

From what has been said above, it is clear that the mechanism described provides a means for automatically keeping engine 1a in a state of dynamic equilibrium with the thrust produced on the airplane by the exhaust gas jet from the engine, and this state of equilibrium will not be disturbed unless there is a change in the reactive pressure of the engine jet or in the liquid pressure in chamber 8. It will also be appreciated that the total movement of engine 1 under the maximum variation of forces acting upon it is very small, being equal to the movement required by lever 19 to bring contacts 26 against the terminals of wires 27—28 and 29—30 or 31—32 and 33—34. This need be only a few hundredths of an inch. In order to limit the further movement of the engine, in the event of failure of the mechanism described above, resilient buffers 92 (Figure 1) may be provided between each end of each engine and the adjacent parts of chassis 2 of the airplane.

It is clear that by connecting all the engines of a multi-engine aircraft in series, as indicated in Figure 2, the control system thus constituted will automatically keep the thrust of all the engines equalized, so that they are all balanced with each other, and each engine will automatically develop the thrust corresponding to the setting of the control lever on engine number 1a.

If trouble develops in any engine of the group, that engine may cut out of operation, without affecting the operation of the other engines, by manually closing a switch 92a which is provided for each engine in the common control circuit 90a—91.

The control system herein above disclosed has been shown and described as controlling the normal operation of a jet engine by regulating the delivery of a variable capacity fuel pump, which supplies fuel to the engine. My control system is not, however, so limited and may also be applied to govern engine operation by varying the cross-sectional area of the engine air intake duct or tail pipe, since it is well known that jet engines may be controlled by so regulating the supply of air to the engine combustion chamber, or the discharge of exhaust gases therefrom.

A simple mechanism for this purpose is disclosed in Figure 4.

A pair of sector-shaped louvers 105 and 106 are pivotally mounted near the exit of tail pipe 104, and adapted to vary the exhaust gas discharge area of the tail pipe by rotation on their axes, in fixed relation to each other, by means of intermeshing sector gears 107. Thus, rotation of louver 105 in a clockwise direction rotates louver 106 in the opposite direction so as to reduce the gas discharge area of tail pipe 104, and vice versa. Louvers 105 and 106 are operated by a piston 108, adapted to reciprocate in a cylinder 109 and connected to louver 106 by means of a piston rod 110 and crank arm 111. Cylinder 109 is mounted on the exterior of tail pipe 104 and is hydraulically connected by conduits 112 and 113 to a valve cylinder 214 of control apparatus 55, as shown in Figure 4.

Cylinder 214 is supplied through an inlet conduit 215 with a liquid (oil) under pressure from a source (not shown) within the aircraft. Slidably mounted in cylinder 114 is a spool valve 216, having a stem 217 connected by a slot and pin 218 to an actuating lever 219 which is pivotally mounted on a rod 220 and connected at its other end by a pin and slot connection 221 to another rod 222. Rod 220 is attached at one end to a bellows 223 which communicates through a conduit 224 with air intake 100 of engine 1a. The other end of rod 220 is attached to a bellows 225 which is evacuated to substantially zero air pressure. Rod 222 is similarly attached at one end to a bellows 226 in communication through a conduit 227 with the compressor discharge chamber in engine 1a, and at its other end to an evacuated bellows 228. A rod 229, slidably mounted in a fixed sleeve 230, has a fixedly attached collar 231 which contacts a spring 232 interposed between said collar and sleeve 230, so as to bias rod 229 to the left and keep its left end in contact with a cam 233 which is adjustably clamped to shaft 55a (Figure 2). Pivotally mounted on the right end of rod 229 is a roller 234 which rolls along a fixed horizontal track 235 and bears against the lower edge of lever 219, as clearly shown in Figure 4.

If the jet reaction thrust of the exhaust gases from engine 1a varies, rod 46 moves up or down and correspondingly varies the position of roller 234, through the movement of arm 54, shaft 55a, cam 233 and rod 229. The movement of roller 234 varies the fulcrum of lever 219 which is pushed downwardly by the compressor discharge pressure in bellows 226. At the same time, bellows 223 varies the position of the fixed pivot which connects lever 219 to rod 220. The overall result of this arrangement is that valve 216 is moved in accordance with the air pressure rise across the compressor 101 of engine 1a, modified by any variation in thrust of the exhaust gases discharged through tail pipe 104. When valve 216 is moved down from its neutral position, as shown in Figure 4, oil under pressure is admitted to the right end of cylinder 109, through conduits 215 and 112, and piston 108 is moved to the left which increases the gas discharge area of tail pipe 104 by separating louvers 105 and 106. Conversely, when valve 216 is moved up from its neutral position, louvers 105 and 106 are brought closer together, thus decreasing the gas discharge area of tail pipe 104.

Since the exhaust gas thrust from the engine is a function of gas discharge nozzle (tail pipe) area, any extraneous increase in said thrust is automatically corrected by movement of rod 46 which causes a movement of louvers 105 and 106 to correspondingly decrease the area of the exhaust gas nozzle and bring said thrust back to its original value. At the same time, the exhaust gas nozzle area is automatically adjusted by variation of the position of roller 234, so as to keep the air pressure rise across the compressor 101 at a desired value.

It is apparent from the foregoing disclosure of control apparatus 55 that, instead of applying it to the exit of tail pipe 104, to regulate the exhaust gas nozzle area, it may alternately be applied to the entrance of air intake 100 (as shown in dotted lines in Fig. 4), to regulate the flow of combustion air to the engine, in a similar manner. When applied to air intake 100, the jet reaction thrust of the engine 1a can be regulated by regulating the flow of air to the engine, in lieu of regulating the discharge of exhaust gases therefrom.

The device 55 for regulating the admission of combustion air to the engine, or the discharge of exhaust gases therefrom, may be either substituted for the fuel pump 52 in my improved control system, or it may be added to the fuel pump in my control system to supplement and extend control of the engine beyond the range of the maximum capacity of the fuel pump with an air intake duct or tail pipe of fixed cross-sectional area, as shown in Figure 1.

*Compensation for forces due to engine mass*

The thrust measured by the reaction between the engine supports 3 and 4 and the liquid in recoil chamber 8 is the net thrust of the engine, i. e., the total thrust minus the inertia and weight components of the engine.

For example, if the airplane is climbing at an angle of inclination α between the engine longitudinal axis and the horizontal plane and is undergoing a linear acceleration "x," then the net thrust, as indicated by the hydraulic fluid pressure in recoil cylinder 8, is $$P = W\left(\sin \alpha + \frac{x}{g}\right)$$

where "P" is the total thrust of the engine in pounds, "W" is the weight of the engine in pounds, and "g" is the acceleration due to gravity.

For an engine weighing 2500 pounds, a climbing angle of 30°, and a forward acceleration of 2 feet per second, the thrust, as measured by the hydraulic pressure in recoil cylinder 8, would be below the total engine thrust by $$2500\left(.5 + \frac{2}{32.2}\right) = 1,400 \text{ lbs.}$$

If these forces due to engine mass were not compensated in the engine control system, an error would be present which would cause an increase in engine thrust during climb and acceleration, and a reduction in engine thrust during descent and deceleration, beyond the value indicated by the position of the pilot's manual control lever 59. Since the effects of engine weight and inertia are in the desired direction, and the engine control mechanism would prevent excessive speeds and temperatures (as hereinafter disclosed) during maneuvers of the airplane, if these effects were not compensated, this characteristic may not be undesirable. However, the pilot will have better control of the airplane if these effects are automatically compensated, and such compensation may be most readily effected by incorporating in the control system a compensating mass, such as the counterweight 69 shown in Figure 2. The weight of counterweight 69 is accurately proportioned to the weight of the engines.

Thus, the effective weight "w" of the counterweight 69 is $$w = \frac{W K r_1}{r_2}$$

where

W = the weight of the engines
$r_1$ = the distance from the pivot of lever 64 to the center line of spring 63, i. e., to the point where the force of spring 63 acts on lever 64.
$r_3$ = the distance from the pivot of lever 64 to the center of gravity of weight 69.

$$K = \frac{Fr_2 - w\left(\sin \alpha + \frac{x}{g}\right)r_3}{\left[P - W\left(\sin \alpha + \frac{x}{g}\right)\right]r_1}$$

where F is the force exerted by weight 69 on spring 63 through lever 64.

The introduction of a mass "$w$" in the form of counterweight 69 thus compensates for the effect of the weight and inertia of the engines during climb and acceleration or during descent and deceleration.

*Use of fuel regulator in thrust control system*

The fuel regulator 52 shown in Figure 2 is of the type disclosed in copending application of Leighton Lee, II, Serial No. 41,632, filed July 30, 1948, and assigned to the same assignee as this application, which shows and describes a gas turbine control in which the fuel metering head across a variable metering orifice is changed with changes in position of a manual control shaft, and the area of the variable metering orifice is a function of air compressor sensing pressure. The regulator disclosed in the Lee application mentioned, is adapted for use with the thrust regulating the equalizing means herein disclosed, as shown schematically in Figure 3.

Referring to Figure 3, the reference numeral 120 denotes a fuel supply conduit leading from a supply tank 119 to a variable capacity fuel pump 121 driven by the engine. A by-pass conduit 122 connects with conduit 120 on each side of pump 121 and has located therein a by-pass relief valve 123, which is biased towards its seat by a spring 124 acting on a piston 125 in a cylinder 126. Conduit 120 connects with a fuel metering valve mechanism 127 which comprises a cylindrical valve casing 128, wherein is slidably mounted a metering valve 129 connected to a guide piston 130. Casing 128 communicates at its upper end with an enlarged chamber 131 and at its lower end with a similar chamber 132. Attached to the upper end of chamber 131 is a pressure responsive bellows 133 which is connected at its lower end to piston 130 and valve 129. A conduit 134 connects the interior of bellows 133 with the compressor discharge chamber of the engine. A similar pressure responsive bellows 135 is attached to the lower end of chamber 132 and to the valve 129. A conduit 136 connects chambers 131 and 132 so as to equalize the pressures therein. In order to make valve 129 responsive to the sensing pressure of the engine compressor, bellows 135 may be placed in communication with the compressor inlet chamber 100 by means of a connecting conduit 135a, so that the difference in pressure between bellows 133 and 135 is equal to the pressure rise across the compressor, or bellows 135 may be vented to atmosphere by a vent 135b, in which case the difference in pressure between bellows 133 and 135 would be equal to the guage pressure of the compressor discharge; or bellows 135 may be completely evacuated and sealed, whereupon the difference in pressure between bellows 133 and 135 is equal to the absolute compressor discharge pressure. The last mentioned alternate is the preferred arrangement.

A conduit 137 leads from valve casing 128 to the fuel nozzles 114 in the combustion chamber 102 of the engine and is provided with a manual cut-off valve 138 for use in emergency. A conduit 139 leads from conduit 137 to a chamber 140 which is also connected by a conduit 141 with fuel supply conduit 120 on the downstream side of pump 121 and relief valve 123. A ball check valve 142 in chamber 140 is biased towards its seat at the inlet of conduit 141 by a spring 143 which reacts against the end of a plunger 144 mounted in the right end wall of chamber 140. The right end of plunger 144 bears against a cam 145 mounted on a shaft 146 which carries the operating arm 51 of the fuel regulator (Figure 1). A conduit 147 connects the interior of cylinder 126 with conduit 141 and with a maximum speed control device 148. Conduit 149 connects conduit 147 with a maximum temperature control device 150, which is also connected with conduit 139 by a conduit 151.

Temperature control device 150 comprises a chamber 152 having a ball check valve 153 seated over the inlet from conduit 149 and biased toward its seat by a spring 154 which reacts against the end of a stem 155 whose other end is attached to a cylinder 156. Cylinder 156 is housed in a larger cylinder 158 attached to the wall of engine tail pipe 104 so that its projects into the stream of exhaust gases discharged therethrough. Cylinders 156 and 158 are connected by an adjustable screw 157 and are made of different metals having materially different coefficients of thermal expansion; that of cylinder 156 being much smaller than that of cylinder 158, so that as these cylinders are heated by the exhaust gases up to the exhaust gas temperature, cylinder 158 expands more rapidly than cylinder 156, and pulls stem 155 upwardly, thereby reducing the compression in spring 154.

The calibration and adjustment between cylinders 156 and 158 are set so as to cause the movement of stem 155 only when the temperature of the exhaust gases approaches the safe maximum limit, and when that limit is reached stem 155 is moved a sufficient distance to weaken spring 154 enough to permit ball check valve 153 to rise from its seat due to the liquid pressure in conduit 149 and allow the escape of liquid from conduit 149 through chamber 152, and conduits 151 and 139 into conduit 137, thereby lowering the pressure in conduit 147.

Maximum speed control device 148 comprises a fly ball speed governor 160 attached to a shaft 161 driven by the engine. The governor arms 162 bear against the lower end of a stem 163 which is attached to a servo valve 165 in cylinder 164, so that when the engine speed increases arms 162 push stem 163 and servo valve 165 upwardly against the force of a spring 166 which bears against the upper end of stem 167 attached to servo valve 165. Spring 166 is seated against the end of an adjustable screw 168 which serves to adjust the compression in spring 166 as desired.

Servo valve 165 is of the conventional spool type, having cylindrical valve portions spaced a fixed distance apart and connected by a rod of reduced cross-section. Cylinder 164 is connected to conduit 147 and also communicates with conduit 139 through a connection 169. The calibration of goveronr 160 and spring 166 are such that the governor does not move servo valve 165 from its normal position, as shown in Figure 3, until the speed of the engine is close to its maximum permissible safe speed, whereupon governor 160 then moves valve 165 upwardly until the port communicating with conduit 147 is opened and liquid escapes from conduit 147 through servo valve chamber 164 and conduits 169 and 139 into conduit 137, thus reducing the pressure in conduit 147.

Conduit 141 contains a restriction 176 which limits the flow through conduit 141 and reduces the pressure therein from the fuel pressure $P_f$ in conduit 120 on the discharge side of pump 121 to a lower pressure $P_s$ on the downstream side of the restriction. Since pressure $P_s$ is equal to pressure $P_f$ minus the drop across restriction 176, $P_s$ is always a definite function of $P_f$. The pressure $P_s$ is transmitted to cylinder 126 and servo valve 148 through conduit 147, to chamber 152 through conduits 147 and 149, and to chamber 140 through conduit 141.

The pressure $P_f$ is transmitted to the fuel metering valve 129 through conduit 120. After passing valve 129, the pressure of the fuel drops to a lower pressure $P_m$, known as the metered fuel pressure, and this pressure is transmitted through conduit 139 to servo valve 148

(through 169), to chamber 152 (through 151), and to chamber 140. From the foregoing, it is clear that the pressure $P_f$ is determined by the pressure $P_s$, plus the force of spring 124 acting on valve 123, modified by the action of check valve 142, while pressure $P_m$ is determined by $P_f$, modified by the action of metering valve 129 which is responsive to variations in absolute compressor discharge pressure, $P_a$. With any given setting of the cam 145 which determines the pressure of spring 143 on check valve 142, and with maximum speed control 148 and maximum thermal control 150 inactive, as they are below selected safe values, the pressure $P_f$ is substantially constant and the flow of fuel to the engine is determined by the degree of opening of metering valve 129 which is controlled by the absolute compressor discharge pressure, $P_a$. As the thrust developed by a jet engine is a definite function of mass air flow through the engine and this in turn is a definite function of compressor discharge pressure, $P_a$, it follows that the flow of fuel bears a definite relationship to the thrust developed by the engine and may thus be used as a means for automatically controlling the thrust for any given setting of the cam 145 which is determined by the pilot through the control system shown in Figure 2.

When cam 145 is rotated in a clockwise direction by the downward movement of arm 51, through the action of the control system shown in Figure 2, plunger 144 is moved to the right by spring 143. This relieves the compression in spring 143 and permits valve 142 to be opened by pressure $P_s$ in conduit 141. The opening of valve 142 permits liquid fuel to escape through chamber 140 and conduit 139 to the downstream side of metering valve 129, thus reducing the pressure $P_s$ and with it, the pressure $P_f$. The fall in pressure $P_f$ reduces the metering head, $P_f - P_m$, on valve 129 which in turn reduces the flow of liquid fuel to the engine, thereby reducing the jet thrust of the engine. Conversely, a rotation of cam 145 in the opposite (counter clockwise) direction, increases the fuel flow and the thrust developed by the engine.

If at any time the engine exceeds a selected maximum safe speed as determined by the setting of adjustable screw 168 on speed governor 160, the latter pushes servo valve 165 up and opens conduit 147 which permits liquid therein to escape through conduits 169 and 139, thereby reducing the pressure $P_s$ in conduit 147, and the pressure $P_f$ in conduits 141 and 120. Reduction of pressure $P_f$ reduces the metering head, $P_f - P_m$ on metering valve 129 which lowers the rate of fuel flow and the speed of the engine, thereby reducing the engine speed back to a safe operating range. Similarly, if the engine (tail pipe) overheats, thermal control 150 operates to open valve 153 which likewise lowers pressure $P_s$ in conduit 147 and thereby reduces the speed of the engine until the temperature in the tail pipe has fallen to a safe value. By thus making the speed and thermal override controls automatic functions of the fuel regulator 52, the pilot is relieved of the necessity of making any manual manipulations to prevent overspeeding or overheating of the engine.

*Operation of control system*

The principles of operation of the control system shown in Figure 2 and described above may be summarized as follows:

(1) The thrust desired from all the engines of a multi-engine aircraft is selected by positioning the manual lever (59).

(2) The positioning of the manual lever determines the magnitude of the current in an electric circuit.

(3) The thrust exerted by each engine is measured and compared with the magnitude of the electric current determined by (2).

(4) Any inequality on any engine between the measured thrust and the magnitude of the electric "control" current actuates an electrical mechanism which acts on the control system of that particular engine to correct the inequality until the measured thrust of any engine equals the desired thrust.

(5) The performance of each engine is controlled by a single manual control for the whole group, but each engine operates independently of all the others, insofar as any correction required to bring its thrust in balance with the thrusts of the other engines is applied to that engine only. Thus, while all the engines are controlled from a single manual control lever, the performance of the other engines is not affected by the performance of any one engine.

(6) The control system of each engine includes (within its fuel regulator) automatic override maximum speed and temperature controls, which prevent overspeeding or overheating of that engine without affecting the operation of the other engines.

More specifically, the operation of the control system is as follows:

(1) Each engine is movably mounted on supports 3 and 4 on the airplane chassis 2, and is restrained from moving relatively to the airplane by the pressure of liquid acting on a diaphragm 7 against which the engine jet thrust reacts. The hydrostatic pressure of the liquid enclosed by the diaphragm is proportional to the thrust exerted by the engine. This hydrostatic pressure acts on a plunger 17 which tends to rotate a gear sector 21 which is resisted by a torque motor 24, to which it is geared. The current flowing through this series wound torque motor is proportional to the square root of the torque. Torque motor 24 could equally well be of the shunt or separately excited type, in which case, the current flowing through the motor would be proportional to the torque of the motor.

(2) As long as the torque exerted by motor 24 is in the correct relationship to the engine thrust, the gear sector 21 remains in a balanced state. If, however, the engine thrust should increase, the force of the plunger 17 will overcome the force of motor 24 on gear sector 21, and the sector will rotate slightly, causing a set of reversing contacts 26 to be closed in a direction corresponding to the increase in engine thrust. The closing of these contacts energizes a fuel regulator motor 38, causing the jet engine to be controlled by the fuel regulator 52 in such a way as to reduce the engine thrust until the force on plunger 17 is no longer able to overcome the force on the gear sector 21, when the contacts 26 will be opened and the engine control will remain at rest until a further change in conditions occurs.

(3) In case of a reduction in the thrust exerted by the engine, a similar action occurs to increase the engine thrust to the desired value, as determined by the setting of the manual control lever 59.

(4) The magnitude of the thrust exerted by the engine is determined by the setting of manual control lever 59, movement of which compresses or decompresses a spring 63, which will disturb the equilibrium of the torque motor 68 and the gear sector 65, causing reversing contacts 71 to close in one direction or the other, according to the direction of movement of manual lever 59 and energize the motor 80 of rheostat 84.

(5) Rheostat 84 is connected in series with motors 68 and 24, and the movement of the arm 85 of rheostat 84 will vary the current flowing through these motors until the torque exerted by motor 68 overcomes the force of spring 63 on gear sector 65, when contacts 71 will open, de-energizing the rheostat motor 80, and allowing the rheostat 84 to remain at rest and the current through motors 68 and 24 to remain constant until further movement is applied to the manual control lever 59.

(6) Since the same current flows through motors 68 and 24, the torques on sectors 65 and 21 vary proportionally and hence there is a determinate relationship between the position of manual control lever 59 and the thrust exerted by the engine.

(7) On a multi-engined airplane, the thrust exerted by all engines may be equalized by placing in series all the torque motors 24 which react against their hydraulic plungers 17. A variation in thrust on any engine then upsets the equilibrium of its sector 21, and causes the control of that engine to act to correct the thrust of that engine only, as described hereinabove.

(8) The thrust measured by the reaction between any engine support and the liquid in its recoil cylinder 8 is the net thrust of the engine minus the inertia and weight components forces of the engine. This result is obtained by incorporating in the lever 64 carrying gear sector 65, a counterweight 69 whose mass (in pounds) is proportioned to the mass (in pounds) of the engine.

(9) Manual selection of operating thrust by setting the position of control lever 59 will actuate the thrust regulating mechanism shown in Figure 2, and this in turn will actuate the input shaft 146 of the engine fuel regulator 52, to adjust the engine thrust to the required value. The thrust may be brought to its desired value by regulating the fuel flow to the engine and this can be achieved by changing the metering head of the fuel regulator 52 associated with that engine. The motion of this cam 145 is the only manipulation required by the fuel regulator 52. Provision is made in each fuel regulator for automatic reduction of its metering head to protect the engine against damage due to overspeed or excessive temperature, as hereinabove described.

(10) On attainment of the maximum thrust of which the engine is capable with an air intake duct or tail pipe of fixed cross-sectional area, an overriding device is incorporated in the control system of each engine to permit the thrust control mechanism to actuate a cross-sectional area control valve in either the air intake duct or the tail pipe of the engine as shown, schematically, in Figure 4.

While I have shown and described the preferred embodiment of my invention, I do not limit my invention to the constructional details disclosed by way of illustration, as these may be changed and modified by those skilled in the art, without departing from the spirit of my invention or exceeding the scope of the appended claims.

I claim:

1. In an aircraft propelled by a jet engine, means for regulating the speed of flight in accordance with the reaction thrust of the engine jet, so as to obtain a definite, selected speed at any selected point in an operating speed range, comprising means for mounting the engine so that it is bodily movable relative to said aircraft in proportion to the reaction thrust of its jet, and electrically actuated motor means for automatically regulating the propulsion power output of said engine by varying the supply of air thereto in proportion to the movement of said engine.

2. In an aircraft propelled by a jet engine, means for regulating the speed of flight in accordance with the reaction thrust of the engine jet, so as to obtain a definite, selected speed at any selected point in an operating speed range, comprising means for mounting the engine so that it is bodily movable relative to said aircraft in proportion to the reaction thrust of its jet, and electrically actuated motor means for automatically regulating the propulsive power output of said engine by varying the discharge of exhaust gases therefrom in proportion to the movement of said engine.

3. In an aircraft propelled by multiple jet engines, means for regulating the speed of flight in accordance with the jet reaction thrusts of all engines, so as to obtain a definite, selected speed at any selected point in an operating speed range, comprising means for mounting each engine so that it is bodily movable relative to said aircraft in proportion to the reactive thrust of its jet, and electrically actuated motor means for automatically regulating the propulsive power of each engine by varying its air supply in proportion to its said movement.

4. In an aircraft propelled by multiple jet engines, means for regulating the speed of flight in accordance with the jet reaction thrusts of all engines, so as to obtain a definite, selected speed at any selected point in an operating speed range, comprising means for mounting each engine so that it is bodily movable relative to said aircraft in proportion to the reactive thrust of its jet, and electrically actuated motor means for automatically regulating the propulsive power of each engine by varying the discharge of exhaust gases therefrom in proportion to its said movement.

5. In an aircraft propelled by multiple jet engines having a single manual control means for regulating their jet thrust, so as to obtain a definite, selected speed at any selected point in an operating speed range, comprising: means for mounting each engine so that it is bodily movable relative to said aircraft in proportion to the total reaction thrust of its jet, electrically actuated motor means for automatically regulating the propulsive power of each engine in proportion to its said movement, and electrical means responsive to said manual control means for equalizing the propulsive powers of all engines by coordinately varying the air supply to each engine.

6. In an aircraft propelled by multiple jet engines having a single manual control means for regulating their jet thrust, so as to obtain a definite, selected speed at any selected point in an operating speed range, comprising: means for mounting each engine so that it is bodily movable relative to said aircraft in proportion to the total reaction thrust of its jet, electrically actuated motor means for automatically regulating the propulsive power of each engine in proportion to its said movement, and electrical means responsive to said manual control means for equalizing the propulsive powers of all engines by coordinately varying the discharge of exhaust gases from each engine.

7. In an aircraft propelled by multiple jet engines symmetrically spaced about the center of gravity of said aircraft, said engines having a single manual control means for controlling the total jet thrust, comprising means for mounting each engine so that it is movable relative to said aircraft in response to the thrust of its jet, electrical motor means for automatically regulating the jet thrust of each engine by its movement, and electrical motor means responsive to said manual control for automatically equalizing the jet thrusts of all engines, by coordinately varying the fuel supply to each engine, whereby all of said jet thrusts are balanced with each other and hence any yaw moment on said aircraft is eliminated.

8. In an aircraft propelled by a jet engine, means for controlling the operation of said engine, comprising: means for mounting said engine so that it is movable with reference to said aircraft in response to the total reaction thrust of its jet, electrically actuated motor means for automatically regulating the jet thrust of said engine by said movement, and hydraulic motor means responsive to engine speed and temperature and operatively associated with said electrically actuated motor means, for regulating the operation of the engine so that neither said speed nor temperature exceeds a selected safe value.

9. In an aircraft propelled by multiple jet engines, means for controlling the operation of said engines, comprising: means for mounting each engine so that it is movable with reference to said aircraft in response to the total reaction thrust of its jet, electrically actuated motor means for automatically regulating the thrust of each engine by said movement thereof, so that all of said jet thrusts are equal, and hydraulic motor means responsive to engine speed and temperature and operatively associated with said electrically actuated motor means, for regulating the operation of the engine so that neither said speed nor temperature exceeds a selected safe value.

10. In an aircraft propelled by a jet engine, means for controlling the speed of flight by the reaction thrust of the engine jet, comprising: means for mounting the engine so that it is movable with reference to said aircraft in response to the reaction thrust of its jet, electrically actuated means for regulating the propulsive power of said engine by said movement, and means for compensating said regulating means for the forces due to engine mass.

11. In an aircraft propelled by a jet engine having an air compressor, means for controlling the speed of flight by the reaction thrust of the engine jet, comprising: means for mounting the engine so that it is movable relative to said aircraft in response to the reaction thrust of its jet, and means responsive to said movement and to variations in the discharge pressure of said compressor for regulating the propulsive power of said engine.

12. In an aircraft propelled by a jet engine having an air compressor, means for controlling the speed of flight by the reaction thrust of the engine jet, comprising: means for mounting the engine so that it is movable relative to said aircraft in response to the reaction thrust of its jet, and electrically actuated means for regulating the propulsive power of said engine by varying the supply of fuel thereto in response to the movement of said engine and to variations in the discharge pressure of said compressor.

13. In an aircraft propelled by multiple jet engines each having an air compressor, means for controlling the speed of flight from the jet reaction thrusts of all engines, comprising: means for mounting each engine so that it is movable relative to said aircraft in response to the reactive thrust of its jet, and means for regulating the propulsive power of each engine by its said movement and in accordance with variations in the discharge pressure of its compressor.

References Cited in the file of this patent

UNITED STATES PATENTS

| | | |
|---|---|---|
| 1,965,751 | Rush | July 10, 1934 |
| 2,088,954 | Gregg | Aug. 3, 1937 |
| 2,103,274 | Sanford | Dec. 28, 1937 |
| 2,219,994 | Jung | Oct. 29, 1940 |
| 2,280,835 | Lysholm | Apr. 28, 1942 |
| 2,397,658 | Goddard | Apr. 2, 1946 |
| 2,452,064 | Mayrath | Oct. 26, 1948 |
| 2,466,908 | Perrill | Apr. 12, 1949 |
| 2,569,444 | Banning | Oct. 2, 1951 |

FOREIGN PATENTS

| | | |
|---|---|---|
| 578,311 | Great Britain | June 24, 1946 |